E. S. ROBINSON.
UNIVERSAL JOINT.
APPLICATION FILED AUG. 16, 1915.

1,180,077.

Patented Apr. 18, 1916.

WITNESSES:
John B. Schrott
E. L. Mueller

INVENTOR
Edward S. Robinson
BY Munn & Co
ATTORNEYS

UNITED STATES PATENT OFFICE.

EDWARD S. ROBINSON, OF SACRAMENTO, CALIFORNIA.

UNIVERSAL JOINT.

1,180,077. Specification of Letters Patent. Patented Apr. 18, 1916.

Application filed August 16, 1915. Serial No. 45,682.

*To all whom it may concern:*

Be it known that I, EDWARD S. ROBINSON, a citizen of the United States, and a resident of Sacramento, in the county of Sacramento and State of California, have invented an Improvement in Universal Joints, of which the following is a specification.

This invention is an improvement in universal joints and has particular reference to the manner of joining the sections of the housing thereof together.

An object of the invention is the provision of a simple and efficient means for joining the sections of the housing together whereby relative movement therebetween and resultant injury to the fastening bolts is prevented.

Another object is the provision of a joint of this character which is easily manufactured, durable, and efficient in carrying out the purpose for which it is designed.

The inventive idea involved is capable of receiving a variety of mechanical expressions, one of which, for the purpose of illustrating the invention, is shown in the accompanying drawing, in which—

Figure 1:
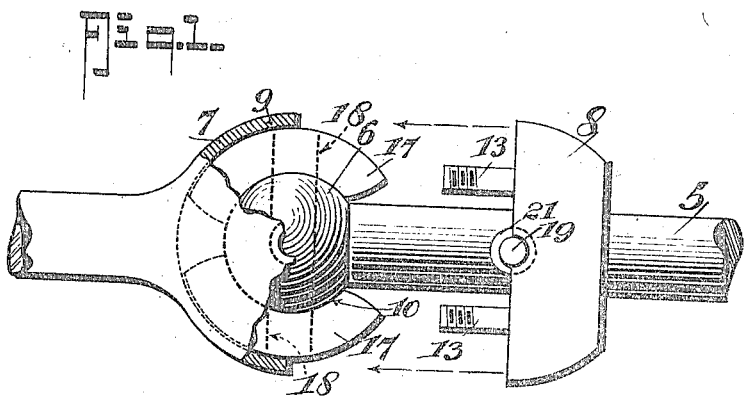
Figure 2:
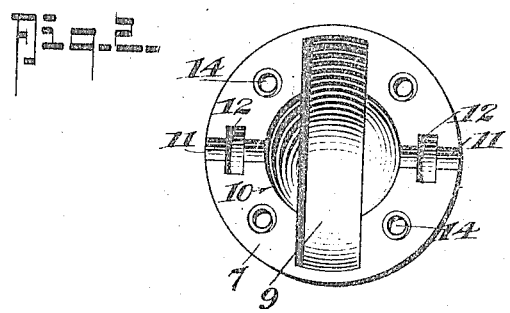
Figure 3:
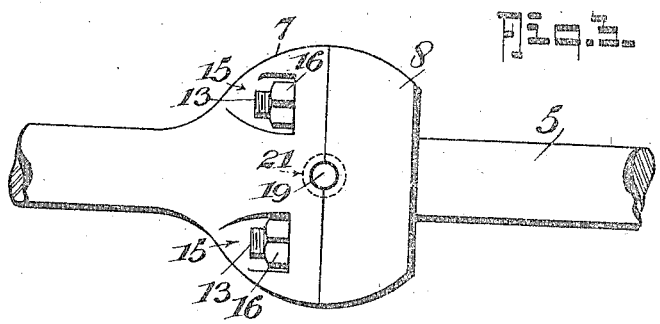

Figure 1 is a side elevation of the joint partly broken away and shown in section, the parts of the housing being shown separated. Fig. 2 is an end elevation of one of the sections of the housing. Fig. 3 is a side elevation of the joint, the sections of the housing being shown secured together.

Referring more particularly to the accompanying drawing in which like reference characters indicate similar parts, the numeral 5 indicates a shaft having a ball 6 at one end thereof.

The housing of the joint comprises the sections 7 and 8, the section 7 being of a substantially spherical shape and having an elongated cavity 9 formed centrally thereof. Arranged on each side of the elongated cavity 9 are oppositely opposed cavities 10 shaped as segments of a sphere and adapted to receive therein the ball 6. Extending radially from the cavities 10 and at right angles to the cavity 9 are oppositely opposed recesses 11 having enlargements 12 intermediate the ends thereof for a purpose which will appear in the course of this description.

The section 8 of the housing has secured thereto a plurality of threaded studs 13 which are adapted to extend through openings 14 formed in the section 7, the threaded ends of the bolts projecting into cut-away portions 15 of said section 7 and secured in position by means of nuts 16 thus securely fastening the two sections 7 and 8 of the housing together. Before securing the two sections together a pair of arcuate bearing members 17 are mounted in the cavity 9 of the section 7 and embrace the ball 6 whereby the latter will have a bearing therein. The bearing members 17 are pivoted to the ball 6 by means of a pin 18 extending therethrough. In order to prevent relative rotary movement between the sections 7 and 8, oppositely disposed pins 19 are mounted in the recesses 11 formed in adjacent abutting edges of the sections 7 and 8, said pins being provided with enlargements 21 which are received in the recesses 11 of the section 7, the enlarged portions 12 of said recesses being adapted to receive the enlargements 21 of the pins.

I claim:—

1. A universal joint comprising a ball member, a housing therefor consisting of sections one of which is provided with radially extending recesses having enlargements therein, the other of said sections having studs extending therefrom and secured to the first-mentioned section, and pins having enlargements mounted between said sections and engaging the recesses and enlargements in the first-mentioned section whereby to prevent relative movement between said sections.

2. A universal joint comprising a ball member, a housing therefor consisting of sections, one of which is provided with an arcuate groove and oppositely opposed cavities on each side of said arcuate groove, adapted to receive said ball member, said section being also provided with radially extending recesses having enlargements therein, arcuate bearing members mounted in said arcuate groove and pivoted to said ball member, the other section of said housing having studs extending therefrom and adapted to be secured to the first-mentioned section, and pins having enlargements mounted between said sections and adapted to engage the recesses and enlargements in the first-mentioned section whereby to prevent relative rotary movement between said sections.

EDWARD S. ROBINSON.

Witnesses:
C. B. SOLOMONSON,
J. L. McCANN.